(12) United States Patent
Stanley

(10) Patent No.: US 7,016,810 B2
(45) Date of Patent: Mar. 21, 2006

(54) SYSTEM AND METHOD FOR ASSIGNING AN ENGINE MEASURE METRIC TO A COMPUTING SYSTEM

(75) Inventor: Roy Craig Stanley, Summerville, SC (US)

(73) Assignee: Gartner Group, Stamford, CT (US)

( * ) Notice: Subject to any disclaimer, the term of this patent is extended or adjusted under 35 U.S.C. 154(b) by 0 days.

(21) Appl. No.: 10/268,639

(22) Filed: Oct. 10, 2002

(65) Prior Publication Data

US 2003/0088668 A1    May 8, 2003

Related U.S. Application Data

(60) Provisional application No. 60/329,467, filed on Oct. 10, 2001.

(51) Int. Cl.
*G06F 11/30* (2006.01)
*G06F 15/00* (2006.01)

(52) U.S. Cl. ......................................... 702/186; 703/22
(58) Field of Classification Search ................ 702/119, 702/122–123, 179–183, 186–188; 712/200, 712/220–221; 703/2, 21–22; 714/47, 722; 709/226
See application file for complete search history.

(56) References Cited

U.S. PATENT DOCUMENTS

| | | | | |
|---|---|---|---|---|
| 5,724,587 A | * | 3/1998 | Carmon et al. ............. | 718/104 |
| 5,802,135 A | * | 9/1998 | Wohlrab ........................ | 378/4 |
| 6,065,131 A | * | 5/2000 | Andrews et al. ............ | 713/600 |
| 6,671,657 B1 | * | 12/2003 | Shigehara et al. .......... | 702/183 |
| 6,691,067 B1 | * | 2/2004 | Ding et al. .................. | 702/186 |
| 6,714,993 B1 | * | 3/2004 | Bhaskaran .................... | 710/2 |
| 2002/0026291 A1 | * | 2/2002 | Lee et al. .................... | 702/186 |
| 2002/0156603 A1 | * | 10/2002 | Alhadef et al. ................ | 703/2 |
| 2002/0161566 A1 | * | 10/2002 | Uysal et al. .................. | 703/21 |
| 2002/0186788 A1 | * | 12/2002 | Patel et al. ................. | 375/316 |
| 2003/0055969 A1 | * | 3/2003 | Begun et al. ............... | 709/226 |
| 2004/0049662 A1 | * | 3/2004 | Janke ......................... | 712/220 |

* cited by examiner

*Primary Examiner*—Marc S. Hoff
*Assistant Examiner*—Mary Catherine Baran
(74) *Attorney, Agent, or Firm*—Baker Botts L.L.P.

(57) ABSTRACT

The invention includes methods for deriving a computer system processing capacity metric for characterizing a computer system comprising at least one computer processor having a known processor clock speed, comprising the step of performing a computational function wherein at least one term of the function is determined by a value X derived at least in part by raising said clock speed to a non-integral exponential power. Processing capacity may be thus calculated by mathematical analysis alone, based on a limited number of inputs regarding a real or theoretical computer system combination, in a fashion that replicates accurately, and can replace, actual physical testing or benchmarkings of systems.

22 Claims, No Drawings

SYSTEM AND METHOD FOR ASSIGNING AN ENGINE MEASURE METRIC TO A COMPUTING SYSTEM

This application claims the benefit of, and incorporates by reference in its entirety, U.S. Provisional Patent Application No. 60/329,467, filed Oct. 10, 2001.

BACKGROUND OF THE INVENTION

The present invention relates to systems and methods for the evaluation and modeling of computer system engines, and in particular to methods and systems for providing in an offline environment, without the need to physically test a particular computer system (or a number of systems), information relative to the processing capacity and/or performance of such system(s), such information being derived by analysis of the components of the computer system.

Users of computer systems, as well as information services administrators and others who may be responsible for evaluating, purchasing, or implementing computer systems, e.g., for an enterprise, often confront multiple choices as to a large plurality of possible system configurations. For instance, within the context of an enterprise server computer system, a company considering the purchase of such a system will have many options as to varying combinations of "candidate" systems having respective system components of differing architecture and performance traits.

Some of these candidate systems may be newly-manufactured systems, while some candidate systems may represent combinations of already-installed components owned by the company, together with additional new upgrade components. Enterprise servers may comprise, among other things, multiple central processing units (CPUs), which may in turn be available in a variety of processor clock speeds (proportional to the number of processing operations such a processor can perform in a second).

The processor(s) may also be configured in a variety of architecture classes or bit, architectures, which partly determine the "channel width" of a given processor. For instance, current Pentium-class processor chips typically employ a 32 bit architecture, whereas currently-used Unix servers may more commonly employ 64 bit architecture classes. For the purposes of this invention, a computer system may be considered as comprising a computer processor or any combination of operationally linked co-operating computer processors, whether located within a single computer unit, or distributed remotely.

Numerous other component variables may contribute to the operation of a particular system, and the ability to mix and match components of varying performance traits or function (e.g., the ability to vary the amount of Random Access Memory in the system, or to choose from among a variety of differing data buses, coprocessors, and special function components) further complicates the task of determining and comparing overall system performance as between custom-configured, or "off-the-shelf," computer systems that are under consideration (e.g., for purchase by the enterprise).

Among the "benchmarks" that an enterprise may wish to consider in evaluating a particular computer system, or comparing a plurality of such systems, is the processing capacity of each system. "Capacity" may be commonly understood as a measure of the maximal amount of computer processing operations that a particular computer system (comprising one or more processors) can perform in a constant period of time. Capacity measurements have been made historically in dimensions of millions of instructions per second (MIPS), but other units may be chosen for measurement of capacity as well. Capacity measurements may be regarded as important for evaluating the practicality (and required system size and configuration) for scaling of server or other computer operations, for side-by-side comparison of multiple systems, for cost analyses, or for other related user evaluations of the computational volume that may be handled by one system vis a vis another.

Capacity does not necessarily dictate that a system of given capacity will actually perform its maximal number of processing operations as used in conjunction with actual programming applications, and does not necessarily indicate whether a system will have desirable operational or output traits as so used with an application. Determining the performance and output of a system as thus actually implemented for applications has posed a separate task from determining capacity. "Performance" may be commonly understood as relating to the quantity of application-specific output (or units of application throughput work) that can be performed by a system in a given unit of time. There is not believed to be, though, any universal definition for what a "unit of work" is in a server environment (although such "unit of work" definitions have been proposed in a mainframe environment). Performance measurement metrics have typically been devised as to each application program or class of application programs.

As the cost of computer systems may well be large, users or potential users will likely wish to learn as much about a particular systems operational traits as possible before, e.g., investing in such system, so as to avoid a poor economic decision in allocating enterprise resources. However, the process of evaluating numerous possible computer systems also places demands upon enterprise resources. At a minimum, employee time must be devoted toward the information gathering and evaluation processes. When a large number of divergent systems are under evaluation, each having a possibly-large number of varying component traits in combination, the process of merely gathering such information may pose a considerable expense of time and money—especially in the case of candidate systems as to which certain system parameters are not readily available (as may occur in the case of a candidate system that consists in part of an already-installed, secondary-market, or other legacy component for which full specifications are not readily available).

Further, existing computer system performance ratings, such as the commonly-known TPC-C, TPC-D, and Specmark ratings, are typically based on running a battery of utilization processes upon an actual candidate server to determine its performance level as actually implemented. In this connection, the Transaction Processing Performance Council (hereinafter TPC) publishes the industry standard performance ratings TPC-C, version 5.0 and TPC-D, version 2.1, which can be found at www.tpc.org/tpcc/spec/tpcc_current.pdf, and www.tpc.org/tpcc/spec/tpcc_current.pdf, respectively, and are attached as Appendix A and B, respectively. The Standard Performance Evaluation Corporation (hereinafter Specmark) publishes a group of benchmark ratings which are maintained and can be found at www.spec.org. Each of these known computer system performance rating standards requires the actual physical testing of processing traits of a specific computer system under actually-implemented testing operations. Configuring multiple candidate systems for actual implementation of testing protocols, as well as gathering the output of such protocols as implemented on the test machines, may impose considerable expense in terms of time, logistics, money, and verification of the accuracy of each empirical test of the physically-configured system.

Thus, it would be desirable to provide a system and method for gaining evaluative information regarding computer system capacity and/or performance by analysis of component combinations, for a broad range of respective actual or theoretical computer systems, without actually running performance tests on a physically-configured example of each candidate system. It would further be desirable to provide such systems and methods requiring only a comparatively-small number of component-characteristic inputs for the analysis, such that extensive information about candidate systems need not be gathered. It would further be desirable to configure such systems and methods in a fashion that provided system metrics consistent with the empirical results of actually-implemented physical testing of actually-configured systems, such that the computational analysis of the analytic, non-empirical method reproduced accurately the empirical data points of as-implemented empirical testing. The prior art is not believed to meet these needs.

SUMMARY OF THE INVENTION

The present invention provides systems and methods for calculating a computer system engine measuring metric ("EMM") by applying a computational methodology to arrive mathematically at a computer system capacity value without having to run workload programs on actually-configured systems.

The present invention includes methods for deriving a computer system processing capacity metric for characterizing a computer system comprising at least one computer processor having a known processor clock speed, including the step of performing a computational function wherein at least one term of the function is determined by a value ("X") derived at least in part by raising the known clock speed to a non-integral exponential power.

Because of its computational basis, the EMM rating produced is not tied to existing performance standards that may be incompatible. Existing performance rating methodologies may frustrate technology users because they measure different elements, and cannot be translated between types of measures or respective applications. Additionally, it may be necessary to formulate new performance metrics or measuring means for new combinations of particular systems and particular applications.

The present invention does not measure performance per se, but rather measures, in the first instance, system capacity. The difficulties of defining performance may thus be ameliorated by providing an EMM as a generic measure that may be calculated for a range of current server technologies and future server technologies and configurations as well. It is believed that in general capacity, as measured by the EMM, may additionally have some significant degree of predictive value for performance traits—that is, performance may usefully be considered, as a roughly-linear function of system capacity, such that systems with greater processing capacity may be considered likely to also have greater performance traits for a particular application than systems with lesser processing capacity. Whether this is strictly true or not, the ready analytical calculation of capacity values in a fashion matching empirically-derived data points may have value in itself for comparisons of multiple systems. The EMM may be applied for evaluation of processing capacity for open systems (generic servers), in specific enterprise operations server implementations, web hosting servers, distributed computing systems, and a range of other systems having one or more processors.

Additionally, the present invention allows for calculation of the EMM capacity metric using only three system-related variables: (a) the number of CPU processors in the system; (b) the clock speed of each CPU; and (c) the bit architecture or channel width of each CPU. The requirement of only three system variables may allow for reduction of data-gathering costs and simplification of the analytic calculation of EMM.

The EMM-calculating method of the present invention provides a computational basis for determining the processing capacity of particular hardware configurations. It need not attempt to factor in performance attributes such as application type, database type, storage configuration, RAM, caching parameters, etc., as the permutations of these aspects might create an extremely complex model requiring constant maintenance, if such a model could be created at all. The EMM-calculating methods of the present invention are designed to create a relative measure for computing the power basis of distributed systems for the purpose of cost and staffing allocation and homogeneous peer group selection.

DETAILED DESCRIPTION OF EXEMPLARY EMBODIMENTS OF THE INVENTION

The fundamental unit in which EMM is expressed in accordance with the present invention is an arbitrarily-defined unit of computing capacity that is designed to approximate the computing ability of server hardware through an empirical algorithm. An amount of EMM units symbolizes any combination of one or more CPUs, a chosen CPU clock speed, and the architecture class, i.e. 32-bit, 64-bit, etc. In the preferred embodiment, each of the CPUs in a plurality of system CPUs will have identical clock speed vis a vis the other CPUs of the system. The methods of the present invention could also be applied to systems having multiple processors of different respective clock speeds, and specifically the present inventions teachings regarding the use of a non-integral, less-than-one, exponential of the clock speed in deriving capacity metrics, albeit such application would require application of different computational formulas.

The process used to assign a particular amount of EMM units to any system is normalized against established benchmarks (769 Spec mark observations based on actual testing of physically-embodied systems of specific configuration in accordance with the Spec mark protocol), ultimately arriving at a computing capacity quantity that mathematically simulates these actually-tested data points. Testing has confirmed that mathematically-derived EMM results track in a similar manner and magnitude, as do Specmarks for the same system environments.

EMM units are measures of computing capacity, similar to mainframe MIPS (Million Instructions Per Second) that define the work ability of the server. EMM units do not attempt to define directly the performance characteristics, because performance is a function of dozens of attributes (OS, channels, channel speed, applications, etc.), the permutations of which do not lend themselves to quantifiable analysis. Through its computational nature, EMM units can help overcome the problems encountered by the existing plethora of standards that are either tied to a particular type of workload, for example TPC ratings, or are incompatible from standard to standard, for example, compatibility between Spec92 and Spec95.

Because the EMM unit derives from a mathematical computation, it does not require constant maintenance or physical testing of actual system components, and can be altered and recomputed within an analysis database, should future changes be required to the formula. In this manner, the EMM can be made be backward compatible, assuming the source data elements are in existence within the database.

The EMM may be simply derived by any computational method suitable for calculating the result of a known mathematical function f(X), wherein X is a constant (for each particular system configuration) derived from selected system component characteristics. As an example, the EMM as set forth in the present invention may be readily calculated using an electronic analyzer (such as a programmed personal computer or calculator). It has been found that common spreadsheet programs, such as Microsoft Excel, used in conjunction with a desktop personal computer as the analyzer, are readily adaptable and useful for calculating, displaying, and storing EMM values for a range of candidate systems, but it will be readily understood that the simple calculation of f(X) could be accomplished using a range of different analyzers.

The present invention thus includes not only the methods set forth herein for calculation of EMM, but also analyzer apparatuses (e.g., personal computers) supplied with programming for performance of the computational method, as well as dedicated software programs or software suites, pre-programmed with spreadsheet or other computationally-enabled functionality, to implement the disclosed EMM-computational functions set forth herein, for purchase or use by end-users in conjunction with their own analyzers. The computational functions and EMM calculations of the present invention may also readily be made available to remote users in a distributed computing environment (e.g., over a VPN or network, or over the Internet), by hosting some or all of the EMM function calculations of the present invention on a central server as the analyzer device (although in such an embodiment, analyzing functions could alternatively be performed at least in part by software objects or other computational analyzer programming provided to the remote users as well), to which server one or more remote users may gain access to interactive system modeling and EMM computation through a network.

In a preferred embodiment, EMM is derived as a function of X, wherein X is derived from only (a) the number of CPUs in the system; (b) the clock speed of each CPU; and (c) the bit architecture value. In this embodiment, X varies linearly with number of CPUs and bit architecture value, but non-linearly with CPU clock speed. This relationship reflects the fact that system capacity does not increase linearly with processor clock speed, as has been empirically demonstrated. The present invention models the increase in system processing capacity as varying in proportion to a derived value "X," X being derived at least in part from a non-integral exponential power of processor clock speed (as expressed in cycles per second or Hertz), wherein the non-integral exponent is less than 1. The variation of capacity (with respect to X) is not directly or linearly proportional, but rather may be expressed and will vary according to a multi-term algebraic function of X (the function being chosen to fit observed data points for actual empirical system capacity testing as described below).

An exemplary and preferred formula used to compute an EMM follows:

$$EMM = aE-bX^3 - cE-dX^2 + gX - h, \qquad \text{Eq. 1}$$

wherein the symbol "E" represents exponential notation (i.e., ten raised to a specific power) and wherein $$X = [(\text{Number of CPUs} * (\text{clock speed})^n) + (\text{Number of CPUs} * (\text{Bit Arch}/p))] \qquad \text{Eq. 2}$$

As for the coefficients in the preceding equations, in a preferred embodiment, a may be a real number between 1 and 10 inclusive, b may be a real number between 10 and 12 inclusive, c may be a real number between 1 and 4 inclusive, d may be a real number between 5 and 7 inclusive, g may be a real number between 0.35 and 0.5 inclusive, and h may be a real number between 0 and 20 inclusive. Likewise, in a preferred embodiment, n is a non-integer less than 1 and greater than 0.7, and p is a real number between 1 and 16 inclusive.

A calculation of this form for determining EMM value was performed for exemplary systems as actually physically tested in conjunction with 769 discrete Spec mark data points for specific system configurations, and it was found that the mathematically derived EMM values for the analytical process of the present invention correlated substantially with substantially all the physical-testing-derived Spec mark data points for the following exemplary coefficients as applied to a, b, c, d, g, and h in the generic formula:

$$EMM = 2E-11X^3 - 3E-6X^2 + 0.4519X - 18.471, \qquad \text{Eq. 3}$$

with the respective coefficients n and p for the computation of X being applied as follows:

$$X = [(\text{Number of CPUs} * (\text{MHz})^{0.9979}) + (\text{Number of CPUs} * (\text{Bit Arch}/8))] \qquad \text{Eq. 4}$$

The above exemplary version of the EMM-calculating formula, with the specific coefficients set forth above, may be used to provide capacity metric calculations that are expected to substantially match or predict actually-tested processor capacity values for an arbitrarily-defined system having arbitrary number of processors and processor clock speed and architecture class in conjunction with currently-contemplated system architectures.

As will be evident to those skilled in the art of fitting curves to empirical data points, or providing mathematical expressions for faithfully reproducing the curves formed thereby, the above exemplary Eqs. 1–4 do not by any means provide the only suitable curve-fitting function for expressing the relation between processing capacity on the one hand and number of CPUs, CPU clock speed, and architecture class; on the other; to the contrary, a large number of functions of varying complexity could also be set forth that would yield data points in accordance with the empirically-derived ones. The four-term function of Eqs. 1 and 3 have been chosen as exemplary, and also comparatively simple for computation vis a vis alternative functions having more terms (or more complex derivations for X). Any function that appropriately accounts for the variation of X in proportion to a non-integral, less-than-one power of clock speed, and the consequent variation of processor capacity as a function of the thus-varying X value derived from such non-integral exponential power of clock speed, may be suitably chosen, as would be evident to one of skill in the art. Appropriate coefficients for the terms of the respective functions thus incorporating such X values may be derived by application of goal-seeking methods and software for deriving equations to fit a function curve to known data points.

Those of ordinary skill in the art will understand that while the foregoing description of the invention has set forth certain illustrative embodiments, the present invention is not limited by the exemplary embodiments set forth herein. In particular, the recitation of certain embodiments in connection with particular computer operating systems or networks or particular analytical applications is non-limitative, and it is a specific advantage of the present invention that it may be readily adapted for use across a wide variety of system, network, and computer language configurations by those of ordinary skill in the art, and that it may be implemented to a number of disparate characterization-related applications, including legacy systems as well as future-developed systems. Thus, the illustrative embodiments set forth herein do not limit the spirit and scope of the present invention, which is limited only by the following claims.

I claim as my invention:

1. A method for deriving a computer system processing capacity metric for characterizing a computer system comprising at least one computer processor having a known processor clock speed, comprising the step of performing a computational function wherein at least one term of the function is determined by a value X derived at least in part by raising said clock speed to a non-integral exponential power.

2. The method of claim 1, wherein said computational function is performed to yield the metric analytically without the need for actual physical testing of the system in operation.

3. The method of claim 2, wherein said function is derived using a curve-fitting procedure based upon at least one set of empirically-derived data points from physical testing of at least one set of system configurations, whereby said function is operable for prediction of capacity metric data of additional system configurations without requirement of physical testing of the additional system configurations.

4. The method of claim 2, wherein X is further derived at least in part from the number of central processing units in the system.

5. The method of claim 2, wherein X is further derived at least in part from an architectural class value for the system.

6. The method of claim 2, wherein the system capacity metric may be determined using only the system data of: (i) number of central processing units; (ii) clock speed of each central processing unit; and (iii) architecture class of the system.

7. The method of claim 2, wherein the value of said function is derived using a computer spreadsheet program operable to calculate, display, and store system metric data on a plurality of system configurations.

8. The method of claim 2, wherein the metric is derived according to the function:

$$f(X)=aE-bX^3-cE-dX^2+gX-h,$$

wherein $X=[(\text{number of system central processing units}*(\text{clock speed of each processor})^n)+(\text{number of system central processing units}*(\text{bit architecture number}/p))]$, wherein a, b, c, d, g, and h, and p are positive real numbers, and wherein n is a real number less than 1 and greater than 0.7.

9. The method of claim 8, wherein:
a is between 1 and 10 inclusive;
b is between 10 and 12 inclusive;
c is between 1 and 4 inclusive;
d is between 5 and 7 inclusive;
g is between 0.35 and 0.5 inclusive;
h is between 0 and 20 inclusive; and
p is between 1 and 16 inclusive.

10. The method of claim 9, wherein:

$$f(X)=2E-11X^3-3E-6X^2+0.4519X-18.471,$$

and wherein
n=0.9979.

11. An apparatus for deriving a computer system processing capacity metric for characterizing a computer system comprising at least one computer processor having a known processor clock speed, the apparatus comprising an analyzer programmed to perform a computational function wherein at least one term of the function is determined by a value X derived at least in part by raising said clock speed to a non-integral exponential power.

12. The apparatus of claim 11, wherein said computational function is performed to yield the metric analytically without the need for actual physical testing of the system in operation.

13. The apparatus of claim 12, wherein said function is derived using a curve-fitting procedure based upon at least one set of empirically-derived data points from physical testing of at least one set of system configurations, whereby said function is operable for prediction of capacity metric data of additional system configurations without requirement of physical testing of the additional system configurations.

14. The apparatus of claim 12, wherein X is further derived at least in part from the number of central processing units in the system.

15. The system of claim 12, wherein X is further derived at least in part from an architectural class value for the system.

16. The system of claim 12, wherein the system capacity metric may be determined using only the system data of: (i) number of central processing units; (ii) clock speed of each central processing unit; and (iii) architecture class of the system.

17. The system of claim 12, wherein the value of said function is derived using a computer spreadsheet program for the analyzer operable to calculate, display, and store system metric data on a plurality of system configurations.

18. The system of claim 12, wherein the metric is derived by the analyzer according to the function:

$$f(X)=aE-bX^3-cE-dX^2+gX-h,$$

wherein $X=[(\text{number of system central processing units}*(\text{clock speed of each processor})^n)+(\text{number of system central processing units}*(\text{bit architecture number}/p))]$, wherein a, b, c, d, g, and h, and p are positive real numbers, and wherein n is a real number less than 1 and greater than 0.7.

19. The system of claim 18, wherein:
a is between 1 and 10 inclusive;
b is between 10 and 12 inclusive;
c is between 1 and 4 inclusive;
d is between 5 and 7 inclusive;
g is between 0.35 and 0.5 inclusive;
h is between 0 and 20 inclusive; and
p is between 1 and 16 inclusive.

20. The system of claim 19, wherein:

$$f(X)=2E-11X^3-3E-6X^2+0.4519X-18.471,$$

and wherein n=0.9979.

21. A method for estimating comparative performance characteristics of a plurality of computer systems having varying respective components and component operational traits without the need for physical testing of the systems or their respective components, the method comprising providing by mathematical analysis alone, by computation of a function, a system processing-operation-per-time capacity value for each of the plurality of systems, wherein said function value for each system derives at least in part from an exponential product of the clock speed of a processor for the system, and wherein the exponent for said product is greater than 0.9 but less than 1, and wherein performance may be estimated without knowledge of any programming application-specific parameters by comparison of said derived processing-operation-per-time capacity value of each respective system.

22. A computer program for deriving a computer system processing capacity metric for characterizing a computer system comprising at least one computer processor having a known processor clock speed, said program comprising programming instructions operable for performing a computational function wherein at least one term of the function is determined by a value X derived at least in part by raising said clock speed to a non-integral exponential power.

* * * * *